United States Patent

[11] 3,613,811

[72] Inventors Ronald I. Brandli;
 Lawrence E. Klema; Gerald D. Reese, all of Roseau, Minn.
[21] Appl. No. 846,153
[22] Filed July 30, 1969
[45] Patented Oct. 19, 1971
[73] Assignee Textron Inc.
 Providence, R.I.

[54] TRACKED VEHICLE SUSPENSION SYSTEM
 8 Claims, 6 Drawing Figs.
[52] U.S. Cl. .................................................... 180/5, 305/24
[51] Int. Cl. .................................................... B62m 27/02
[50] Field of Search ............................................ 180/5; 305/24, 27, 28, 16, 17, 18, 22

[56] References Cited
 UNITED STATES PATENTS

| | | | |
|---|---|---|---|
| 1,660,104 | 2/1928 | Smyth | 305/18 |
| 2,339,886 | 1/1944 | Shannon | 180/5 |
| 2,419,522 | 4/1947 | Acton | 180/5 |
| 3,136,378 | 6/1964 | Patee | 180/5 |
| 3,309,150 | 3/1967 | Marier | 305/27 |
| 3,404,745 | 10/1968 | Smieja | 180/5 |
| 3,485,312 | 12/1969 | Swenson | 305/24 X |

Primary Examiner—Richard J. Johnson
Attorney—Merchant & Gould

ABSTRACT: A suspension system for a tracked vehicle is shown, having a unitary suspension frame including a pair of relatively flexible slide rails for engagement with the lower run of the drive track. Idler means mounted on the rear end of the frame support the rear end of the track. Front and rear pairs of sloping support arms are pivotally connected to the body at their upper ends and are connected to the frame at their lower ends by pivotable link members that accommodate limited relative longitudinal movements between the frame and the body. Front and rear suspension spring means are mounted between the body and the frame. Rearwardly and downwardly sloping control arm means are pivotally connected between the body and the front end portion of the frame so that the pivotal movements thereof force the frame away from the body when the frame moves forwardly with respect to the body, thereby forcing the drive track into tighter engagement with the ground. The front pair of support arms limits the pivotal movements of the control arm means.

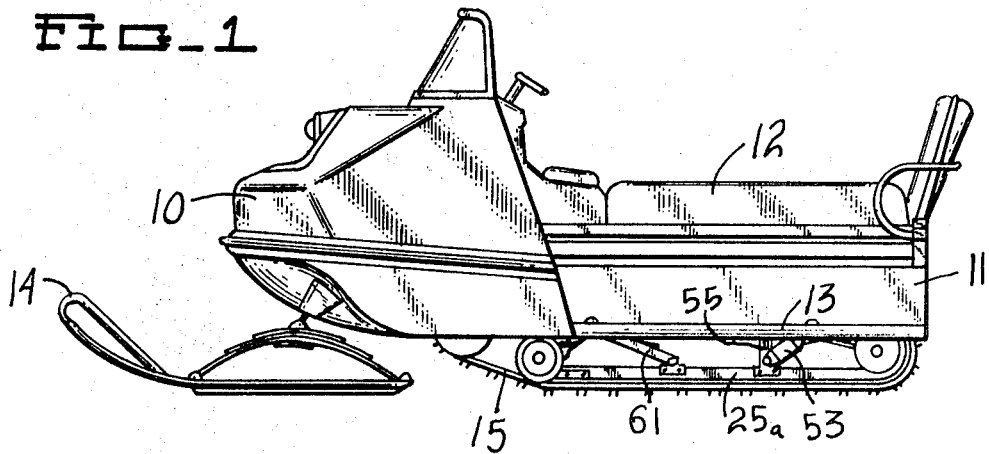
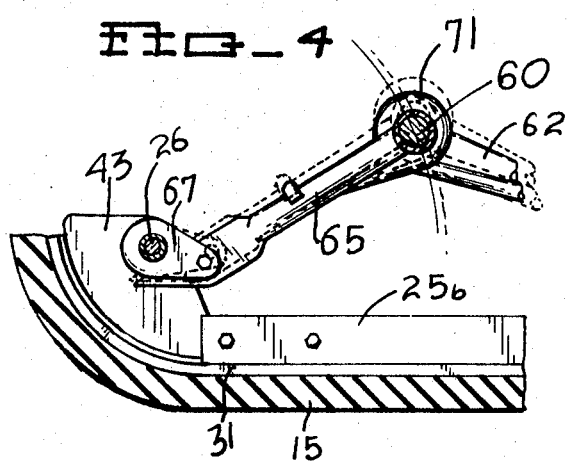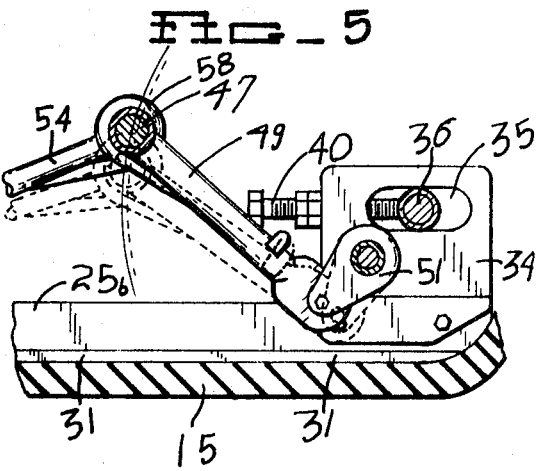
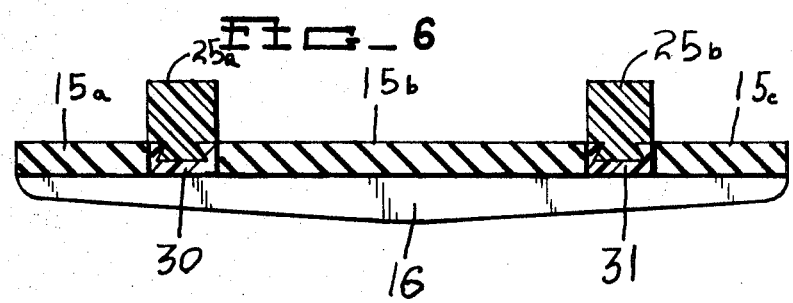

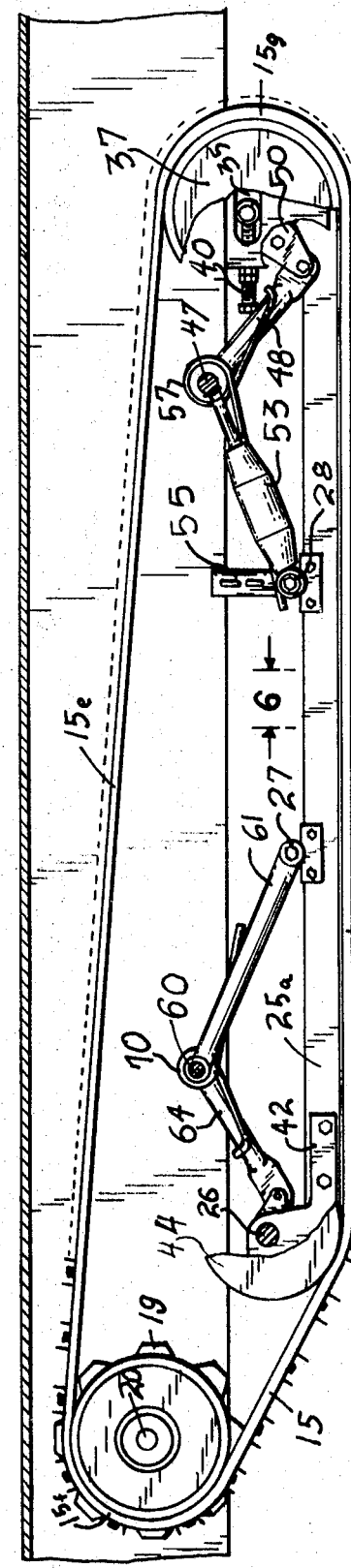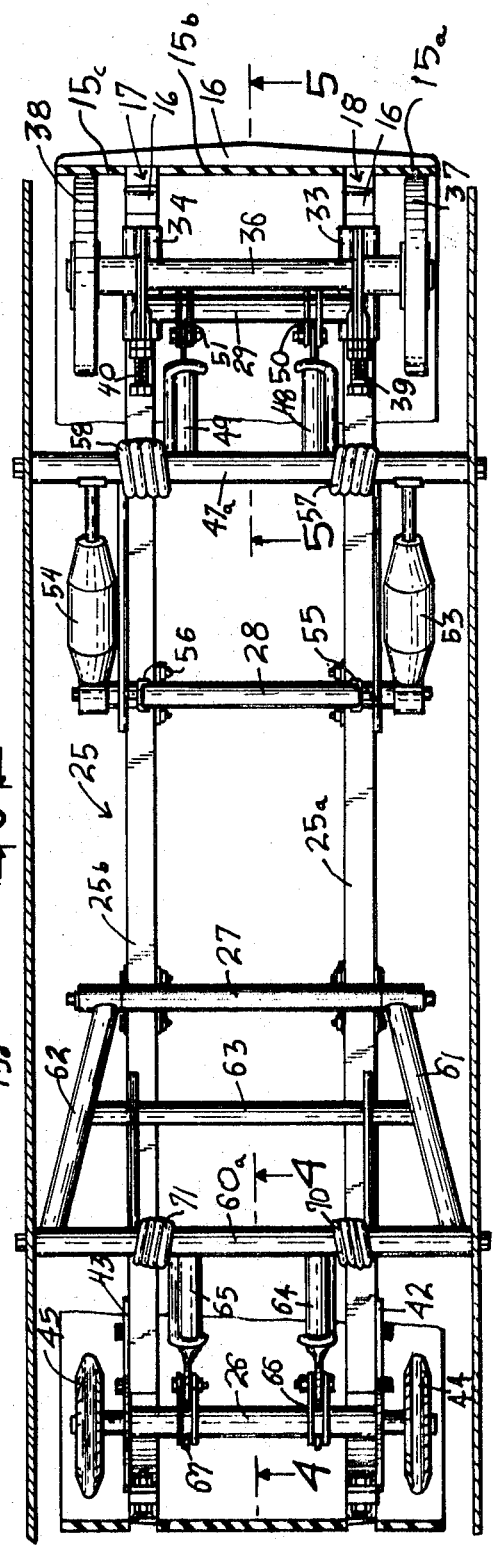

TRACKED VEHICLE SUSPENSION SYSTEM

BACKGROUND OF THE INVENTION

Field of the Invention

This invention relates generally to suspension systems for vehicles and more particularly relates to an improved suspension system for a vehicle that is supported and propelled by endless drive track means.

Description of the Prior Art

Many all-terrain vehicles employ endless drive track means to support and propel the vehicle. Either the entire vehicle weight or a major portion of it is supported by the drive track, or drive tracks, through a suitable suspension system mounted between the drive track and the vehicle body. Typically, the suspension system employs a plurality of track engaging wheels or one or more slide rails that ride on the upper surface of the ground-engaging lower run of the drive track. In effect, the drive track provides a relatively flat road over which the vehicle rides.

If optimum performance is desired, the lower run of the track must be maintained in a relatively flat condition so that the vehicle does not have to, in effect, continuously progress over a series of hills formed by the track. Rigid slide rails have been used to maintain the track in a flat condition, but the associated suspension systems have been heavy and cumbersome. Attempts have been made to use flexible slide rails to achieve better performance, but the results have also been unsatisfactory. A further requirement for optimum performance is that the drive track must remain in contact with the ground over its entire length so that the best flotation and traction are obtained. As with other vehicle, the normal tendency of a track vehicle is to rise at its front end when power is applied. When this happen, the front end of the drive track may lose contact with the ground, thus reducing its effectiveness in supporting and propelling the vehicle. One approach to overcoming this problem is shown in the E. E. Hetteen U.S. Pat. No. 2,970,662 that issued Feb. 7, 1961.

Therefore, it is known that if maximum performance is to be achieved, the track should be kept flat but not completely rigid, and means should be provided to keep the track in contact with the ground over its entire length. Further, the suspension system should be rather firm so that the vehicle does not tend to bounce repeatedly in response to shocks. A hard and uncomfortable ride is associated with high performance, as opposed to a soft and comfortable one. Of course, the suspension system should prevent lateral relative movements between the body and the track so that good control and stability is maintained.

Many different types of suspension systems have been designed in order to accomplish one or more of these objectives. However, these prior art suspension systems have, in our experience, failed to provide all of the operational characteristics necessary for optimum performance.

SUMMARY OF THE INVENTION

The present invention provides a suspension system designed for maximum performance. The suspension system is firm so that the body does not sway or bounce with respect to the drive track. The ground-engaging run of the drive track is physically held in a flat condition to minimize drag between the suspension system and drive track, but at the same time some flexing of the drive run is permitted to reduce shocks and improve traction. Further, this suspension system will tend to force the entire drive run of the track into engagement with the ground whenever power is being applied. These and other important features of the present invention will be discussed further in the following specification, in connection with the attached drawings.

BRIEF DESCRIPTION OF THE DRAWINGS

FIG. 1 is a view in side elevation of a vehicle incorporating the suspension system of this invention;

FIG. 2 is an enlarged fragmentary view in side elevation of the suspension system, portions thereof being broken away and portions being shown in section;

FIG. 3 is a top plan view of the suspension system shown in FIG. 2, portions thereof being broken away and portions being shown in section;

FIGS. 4 and 5 are enlarged views in side elevation of the front and rear portions respectively of the suspension system and drive track, portions thereof being broken away and portions being shown in section, and showing alternate positions thereof; and FIG. 6 is an enlarged vertical sectional view of the drive track and slide rails, taken between lines 6—6 of FIG. 2.

DESCRIPTION OF THE PREFERRED EMBODIMENT

Referring now to the drawings, wherein like reference numerals are used throughout the several views to indicate like elements of the invention, there is disclosed in FIG. 1 a vehicle having an elongated body including a nose portion 10 and an inverted, generally U-shaped rear portion 11. A seating portion 12 is carried by the rear portion 11, and a footrest member 13 extends outwardly from each side of the bottom edge of rear portion 11. Nose portion 10 is partially supported by a pair of steerable skis 14, one of which is shown in FIG. 1.

Mounted beneath and partially within the confines of the inverted, generally U-shaped rear portion 11 is an endless drive track 15. As best shown in FIGS. 3 and 6, track 15 is formed from three separate endless belts 15a, 15b and 15c, that are held together by a plurality of spaced, transversely extending cleats 16 secured by rivets or the like to the outer surface thereof. Preferably, each of the track portions 15a, 15b and 15c is molded from a single piece from rubber provided with suitable reinforcing materials, although the particular form of track used is not critical to the present invention. The three track portions 15a, 15b and 15c are spaced and in conjunction with the cleats 16 define two rows 17 and 18 of openings for reception of the teeth of a pair of drive sprocket wheels 19, one of which is shown, mounted on a transverse drive shaft 20 journaled at the front end of rear portion 11. The two sprocket wheels 19 ride in the openings 17 and 18 between the track portions and the teeth thereof engage the cleats 16 to drive the track.

Although not shown on the drawings, one end of the drive shaft 20 is provided with a metal, toothed sprocket wheel for engagement with a drive chain extending from the vehicle transmission. The two sprocket wheels 19 provide not only driving force for the track 15 but also support the front end thereof. Drive track 15 has a lower ground-engaging drive run 15d, an upper return run 15e, a front end portion 15f engaging sprocket wheels 19, and a rear end portion 15g located adjacent the rear end of the body.

An elongated, unitary suspension frame 25 is positioned between drive run 15d and return run 15e. Suspension frame 25 comprises a pair of longitudinally extending, parallel frame members 25a and 25b. Frame members 25a and 25b are held in this spaced relationship by transversely extending shaft means. These include a forward pair of shaft means 26 and 27 and a rearward pair of shaft means 28 and 29. These shaft means hold the two frame members 25a and 25b a distance apart corresponding to the distance between the openings 17 and 18 in track 15. Preferably, frame members 25a and 25b are constructed from a resilient material having memory characteristics, such as a multiplicity of elongated flexible glass fibers extending longitudinally and molded together with a suitable binder of synthetic plastic material. These fiber glass members are extremely strong but are somewhat flexible to aid in absorbing shocks. Secured to the bottom surface of frame members 25a and 25b are lower slide or skid sections 30 and 31 made from a material having a low coefficient of friction. Suitable materials include polytetrafluoroethylene, commonly known as Teflon, high density polyurethane or similar materials. The slide sections 30 and 31 are secured to the members 25a and 25b by a dovetail connection and a forwardly located bolt, as shown on the drawings. Further details of a similar slide rail construction can be found in the Albin R. Erickson U.S. Pat. No. 3,544,821 issued Dec. 8, 1970. Basically, the two slide rails comprising members 25a–30 and 25b–31 extend into the two openings in the track 15, and the bottom surfaces thereof engage the top surfaces of the cleats 16.

Bolted to the rear end of frame members 25a and 25b are a pair of upstanding support plates 33 and 34. Each of the plates 33 and 34 is provided with a horizontally extending slot 35 through which extends an idler shaft 36. A pair of idler wheels 37 and 38 are rotatably mounted on the opposite ends of shaft 36. Support plates 33 and 34 carry threaded adjustment devices 39 and 40 to adjust the position of shaft 36 in the openings 35. Drive track 15 is entrained over this rear idler assembly with the two idler wheels 37 and 38 engaging the inner surface of track portions 15a and 15c. The threaded adjustment devices 39 and 40 move the idler wheels forwardly or rearwardly with respect to the frame 25 to change the tension on the drive track. It is noted that this rear idler assembly is supported solely by frame 25 and is not in any way directly connected to the vehicle body.

Bolted to the front ends of frame members 25a and 25b are another pair of upstanding support plates 42 and 43. The lower edges of these two support plates 42 and 43 are curved upwardly to provide support for the curved front end portions of sides 30 and 31. As shown in FIG. 3, the front ends of slides 30 and 31 are bolted to the upper leading portion of support plates 42 and 43. Shaft means 26 also extends through plates 42 and 43 for support thereby. Journaled for rotation on the opposite ends of shaft means 26 are a pair of idler wheels 44 and 45 that engage the inner surfaces of track portions 15a and 15c. The two idler wheels 44 and 45 aid in causing the track to smoothly engage the front portions of the slide rails.

Extending laterally across rear portion 11, through openings in the opposite vertical sidewalls thereof, is a support shaft 47, that extends below the return run 15e and above the suspension frame 25. The ends of shaft 47 are threaded and are secured to the rear portion 11 by suitable threaded nuts as shown in FIG. 3. A tubular sleeve 47a is mounted on shaft 47 and extends between the two sidewalls. A pair of spaced support arms 48 and 49 are welded to sleeve 47a and extend downwardly and rearwardly therefrom.

Shaft means 29 also includes a rotatably sleeve to which is secured two spaced pairs 50 and 51 of flat link members that extend forwardly and downwardly therefrom. The link members are thus pivotally connected to the frame. The lower ends of the two support arms 48 and 49 each extend between a corresponding pair of the link members 50 and 51 and are secured for pivotal movements with respect thereto by means of suitable bolts. The upper ends of support arms 48 and 49 are thus pivotally secured to the snowmobile body by means of sleeve 47a and the lower ends thereof are pivotally secured to the lower ends of the two pairs of link members 50 and 51. The two pairs of link members 50 and 51 are pivotally mounted with respect to the frame 25 by means of the sleeve on shaft means 29. This linkage permits suspension frame 25 to move a predetermined amount longitudinally relative to the snowmobile body. At the same time, however, this linkage prevents more than an insignificant amount of relative lateral movement between the frame and body.

A pair of shock absorbers 53 and 54 have their ends connected to sleeve 47a and shaft means 28. Extending upwardly from shaft means 28, directly above frame members 25a and 25b, are a pair of fixed bracket members 55 and 56 each having a plurality of vertically spaced hooks formed thereon.

The central portions of a pair of torsion springs 57 and 58 are mounted on sleeve 47a. A rearwardly extending end portion of spring 57 engages support arm 48 and a rearwardly extending end portion of spring 58 engages support arm 49. Springs 57 and 58 each have a forwardly extending end portion that extends over and rests on shaft means 28. Torsion springs 57 and 58 are tensioned so as to cause the two support arms 48 and 49 to be drawn downwardly and forwardly and to cause the shaft means 28 to be forced downwardly and rearwardly. This tensioning of the two springs 57 and 58 tends to resist any downward movement of the snowmobile body with respect to suspension frame 25. If a firmer ride is desired, the forwardly extending end portions of the two springs 57 and 58 can be lifted upwardly and placed over selected ones of the hooks on bracket members 55 and 56. The firmness of the suspension increases as the end portion is raised to a higher level. The two shock absorbers 53 and 54 are of course designed to damp oscillations of the two springs. In the preferred embodiment of our invention, the two shock absorbers exert an influence in both directions, but the primary effect is on the upward stroke.

Another mounting shaft 60 having a sleeve 60a mounted thereon extends across the body between the upper and lower runs of drive track 15, as previously described for shaft 47. Shaft 60 is positioned above the front end of frame 25 and rearwardly of the drive sprocket wheels 19. Welded to the opposite ends of sleeve 60a are a pair of control arms 61 and 62 that extend downwardly and rearwardly therefrom for connection at their lower ends to the tubular sleeve on the next rearwardly located shaft means 27. The upper ends of the control arms 61 and 62 are thus pivotally connected with respect to the vehicle body, and the lower ends of the control arms are pivotally connected with respect to the suspension frame 25. Extending between the two control arms 61 and 62, and connected securely at its opposite ends thereto, is a tubular brace member 63.

Also welded to sleeve 60a are a pair of spaced support arms 64 and 65 that extend forwardly and downwardly therefrom. Two similarly spaced pairs 66 and 67 of link members are mounted on the sleeve on shaft means 26. The two pairs of link members 66 and 67 extend downwardly and rearwardly therefrom, and are connected at their free ends to the lower ends of support arms 64 and 65 by suitable bolts permitting pivotal movements therebetween. The lower ends of the two front support arms 64 and 65 extend beyond their connections with link members 66 and 67 to a point beneath shaft means 26, to thereby limit the upward movements thereof.

Also mounted on sleeve 60a are a pair of torsion springs 70 and 71. The rearwardly extending end portions of the torsion springs rest on the top of tubular brace 63. The forwardly extending end portions of the two torsion springs are supported by the upper surfaces of the two front support arms 64 and 65. Again, the two torsion springs 70 and 71 tend to oppose downward movements of the body with respect to the suspension frame 25.

Broadly speaking, the two frame members 25a and 25b, and the two slides 30 and 31 connected thereto, form a pair of slide rails for engagement with the lower ground-engaging drive run of the track. The vehicle body is supported on these two slide rails by the two yieldable suspension assemblies mounted on shafts 47 and 60. The suspension system operates as follows. If the front end of the track 15 encounters an obstacle, the obstacle will tend to force the front ends of the two slide rails upwardly toward the rear portion 11 of the vehicle body. As the two slide rails forming frame 25 move upwardly, the two torsion springs 70 and 71 are compressed, the two control arms 61 and 62 pivot downwardly about their connection with shaft means 27, and the two pairs of link members 66 and 67 pivot downwardly about shaft means 26 to permit the necessary downward and forward movement of the two front support arms 64 and 65. As the obstacle moves rearwardly, the two torsion springs force the assembly back toward its normal position.

The same type of action occurs as the obstacle reaches the rear end of the drive track 15. Again, the rear end of frame 25 is forced upwardly toward shaft 47. The two shock absorbers 53 and 54 collapse a small amount to accommodate this movement and the two pairs of link members 50 and 51 pivot with the sleeve on shaft means 29 to aid in accommodating this movement. The opposite end portions of the two springs 57 and 58 are forced upwardly, increasing the tension thereon, and when the obstacle passes, the springs force the slide rails downwardly away from the body under the damping influence of the two shock absorbers.

A very important feature of the present invention is the fact that the vehicle body is supported at four relatively equally spaced apart positions along the length of the two flexible slide rails forming the frame. Under normal driving conditions, some weight is being carried by each of shafts 26, 27, 28 and 29. The weight of the vehicle is thus relatively equally distributed over the length of the two flexible slide rails, tending to keep them relatively flat and in tight engagement with the drive track, but permitting some flexing of the frame in response to shocks. The flexible slide rails also permit the drive run to conform to some degree to the terrain, instead of merely traveling from crest to crest, thus improving traction. This suspension system also operates to increase the firmness of the ride as the body and suspension frame move closer together. The stiffness of the suspension increases very rapidly as the two sets of torsion springs begin to flatten out. Therefore, under light load conditions and during encounters with relatively small obstacles, the ride becomes more firm. As previously described, the tension of the rear springs can be changed, but this does not affect the tension of the front springs.

The suspension system of our invention also provides the important function of forcing the track into tighter engagement with the ground when power is applied. This is contrary to the normal tendency of a vehicle to rise at its front end when power is applied. FIGS. 4 and 5 disclose in full lines a normal position of the vehicle and suspension frame. Because the movement is relative, the frame is shown as being fixed, while the vehicle as represented by the two shafts 47 and 60 is shown as moving with respect thereto. When power is applied to the drive track, the various elements move to a different position as shown in phantom. Rotation of sprocket wheel 19 in a counterclockwise direction pulls the upper return run 15e to the left as viewed in FIG. 2. As upper run 15e is pulled to the left, it exerts a forward force on the rear idler assembly including idler sprocket wheels 37 and 38, tending to move the idler assembly forwardly with respect to the vehicle body. To express it another way, the distance between drive shaft 20 and idler shaft 36 decreases. This force is transmitted by the rear idler assembly to the suspension frame 25, which moves a short distance forwardly as permitted by the connection between it and the body. This forward movement of frame 25 is relative to the body, so can be considered a rearward movement of the body. Thus, in FIGS. 4 and 5, the frame 25 and idler assembly are shown as not moving, but the body is shown as moving rearwardly to the phantom position. In FIG. 4, a pair of arcs has been drawn about shaft means 26 showing the rearward movement of the body from the full line to the phantom position. A similar set of arcs has been drawn about idler shaft 36 in FIG. 5. The drawings are merely illustrative and are not necessarily to scale, but the relative longitudinal movement is shown.

The effect of this relative movement between the frame 25 and the body is to cause control arms 61 and 62 to pivot about the two mounting shafts to the phantom position of FIG. 4. This pivoting of the two control arms causes the distance between the body and the suspension frame to increase, thus tending to force the frame and drive track into the ground for tighter engagement therewith. As clearly shown in FIGS. 4 and 5, the four pairs of link members freely pivot to accommodate this relative longitudinal movement between the body and suspension frame. The front pair of support arms 64 and 65 also act to limit the amount of pivotal movement of control arms 61 and 62 that can occur when power is applied. Referring to FIG. 4, it can be seen that as the front end of the control arms move upwardly, shaft 60 moves therewith and carries with it the two front support arms 64 and 65. The two support arms 64 and 65 in turn cause the counterclockwise rotation of the two pairs of link members 66 and 67, again as viewed in FIG. 4. As the angle increases between the support arms and link members, the extended lower end of the two support arms moves upwardly and finally engages the lower surface of shaft means 26 to prevent further movements thereof. If this stop member is not used, the system will still operate properly under normal conditions. In such case, however, one of the members might pass over center and fail to return, thus rendering ineffective the suspension system.

It should be understood that the full line positions of the suspension system shown in the drawings are shown with the vehicle at rest, carrying no load. Under normal operating conditions, with one or more people on the vehicle, the suspension system would be flattened somewhat so that the movements represented in FIGS. 4 and 5 would be much greater.

The steering of the vehicle is also favorably affected by this suspension system. During acceleration or straight running under power, the nose portion 10 of the vehicle will be raised because of the control arm action tending to force the front ends of the slide rails into tighter engagement with the track. When the nose portion is raised, the skis exert less pressure on the ground reducing frictional drag. When the vehicle is decelerated, however, the control arms return to their normal position, permitting the nose portion of the vehicle to move downwardly and place more weight on the skis. With more weight on the skis, better steering is possible.

The present invention thus provides a firm, highly stable suspension system for a tracked vehicle. Because the factors affecting performance have been closely analyzed and improved in each case, considerably increased performance has resulted with this system.

What is claimed is:

1. In a vehicle having an elongated unitary body with ski-steering means at the forward end thereof, having an endless drive track with a lower ground-engaging run and an upper return run, and having drive means engaging the front end of said drive track, and improved suspension system, comprising:
   a. a unitary suspension frame positioned between said upper and lower runs;
   b. track engaging means mounted on said frame for engaging the lower run of said track;
   c. idler means mounted on said frame for supporting a rear end of said drive track;
   d. yieldable suspension means mounted on said body;
   e. means including pivotal link means attaching said suspension means to a rear portion of said frame for limited relative longitudinal movements between said frame and said body;
   f. downwardly and rearwardly sloping control arm means pivotally connected between a forwardly located portion of said frame and said body to increase the distance therebetween upon said frame moving forwardly with respect to said body;
   g. front support arm means having an upper end thereof pivotally connected to said body adjacent said control arm means and extending forwardly and downwardly therefrom;
   h. link means pivotally connected to both a lower end of said front support arm means and said frame to accommodate limited relative longitudinal movement between said frame and body and to limit the movement of said control arm means; and
   i. spring means mounted on said body biasing said control arm means and front support arm means away from said body.

2. A suspension system for a tracked vehicle having an elongated body with ski-steering means mounted on the forward end thereof, drive sprocket means mounted intermediate the ends thereof, and an endless flexible drive track having a front end portion thereof entrained over said drive sprocket means for driving engagement therewith, said track having a lower ground-engaging drive run, an upper return run and a rear end portion located adjacent the rear end of said body; comprising:

a. a pair of spaced slide rails with first and second ends, extending longitudinally of and disposed in overlying sliding engagement with the lower run of said track;
b. forward and rearward shaft means extending transversely of and connected to said slide rails for holding said slide rails in a predetermined spaced relationship;
c. idler means mounted on said second end of said slide rails for supporting said rear end portion of said track;
d. first support means including support arm means and suspension spring means connected between said body and said rearward shaft means urging said slide rails into engagement with said drive run, said support arm means having an upper end thereof pivotally connected to said body and extending rearwardly and downwardly therefrom;
e. link means connecting a lower end of said support arm means to said rearward shaft means to permit relative longitudinal movement between said shaft means and said body, said link means being pivotally connected to said shaft means and extending forwardly and downwardly therefrom, a lower end of said support arm means being pivotally connected to the lower end of said link means;
f. downwardly and rearwardly sloping control arm means having a forwardly located end thereof pivotally mounted on said body and a rearwardly located end thereof pivotally mounted on said forward shaft means to increase the downwardly directed pressure on said first end of said slide rails upon said slide rails moving forwardly with respect to said body; and
g. means including suspension spring means connected between said body and said first end of said slide rails for urging said slide rails into engagement with said drive run and for limiting the pivotal movement of said control arm means.

3. The apparatus of claim 2 wherein said forward shaft means comprises a pair of shafts, wherein said control arm means is connected to a rear one thereof, wherein said last named means includes front support arm means having an upper end thereof pivotally connected to said body and extending forwardly and downwardly therefrom, and second link means pivotally connected to a front one of the forward shaft means and extending rearwardly and downwardly therefrom, a lower end of said front support arm means being pivotally connected to a lower end of said second link means.

4. The apparatus of claim 3 wherein said lower end of said front support arm means extends beyond its connection with said second link means and beneath said front shaft of the forward shaft means to engage the bottom of said shaft after a predetermined amount of relative pivotal movement between said front support arm means and second link means.

5. In a vehicle having an elongated unitary body with an endless drive track having a lower ground-engaging run and an upper return run, and having drive means engaging the front end of said drive track, an improved suspension system, comprising:
a. a unitary suspension frame positioned between said upper and lower runs, including means for engaging the lower run of said track;
b. means mounted on said frame for supporting a rear end of said drive track;
c. sloping support arm means extending between said body and said frame;
d. means including link means pivotally connecting said support arm means between said body and said frame for limited relative longitudinal movement between said body and said frame;
e. spring suspension means cooperating with said support arm means, said spring suspension means comprising a torsion spring having a central portion thereof mounted on said body and end portions thereof extending forwardly and rearwardly therefrom, one end portion being supported by said support arm means;
f. a plurality of vertically spaced hook means mounted on said frame with a selected one thereof being adapted to support said other end portion of said torsion spring; and
g. control arm means pivotally connected between a forwardly located portion of said frame and said body to increase the distance therebetween upon said frame moving forwardly with respect to said body.

6. In a vehicle having an elongated body with an endless drive track having a lower ground-engaging run and an upper return run, and having drive means engaging the front end of said drive track, an improved suspension system, comprising:
a. a suspension frame positioned between said upper and lower runs, including a plurality of cross-shafts;
b. means mounted on said frame for engaging and supporting the lower run and the rear end of said track;
c. rearwardly located yieldable suspension means including a pair of spaced support arms pivotally attached to the body and extending rearwardly and downwardly therefrom;
d. link members mounted on one of said cross-shafts for pivotal movements with respect to said frame, said link members extending generally downwardly from said cross-shaft;
e. means pivotally connecting a lower end of each said support arm to the lower end of one of said link members;
f. said support arms and link members providing a linkage between said body and frame permitting a predetermined amount of relative longitudinal movement between said body and frame and preventing relative lateral movements therebetween; and
g. further suspension means including control arm means mounted between a forwardly located portion of said frame and said body to increase the distance therebetween upon said frame moving forwardly with respect to said body.

7. The apparatus of claim 6 including forwardly and downwardly extending shock absorber means having one end pivotally mounted on said body adjacent said support arms and the other end pivotally attached to one of said cross-shafts to damp the movements of said frame with respect to said body.

8. In a vehicle having an elongated body with an endless drive track having a lower ground-engaging run and an upper return run, and having drive means engaging the front end of said drive track, an improved suspension system, comprising:
a. a suspension frame positioned between said upper and lower runs;
b. means mounted on said frame for engaging and supporting the lower run and the rear end of said track;
c. rearwardly located yieldable suspension means including a pair of spaced support arms;
d. two pairs of flat link members;
e. means pivotally connecting one end of each said support arm means between a pair of said link members;
f. means connecting said support arms and link members between said body and frame to provide linkage permitting a predetermined amount of relative longitudinal movement between said body and frame and preventing relative lateral movements therebetween;
g. further suspension means mounted between a forwardly located portion of said frame and said body including means to increase the distance therebetween upon said frame moving forwardly with respect to said body; and
h. a pair of spring biased front support arms each having an upper end thereof pivotally connected to said body, two pairs of front link members pivotally connected to said frame, and means pivotally connecting a lower end of each front support arm between a pair of said front link members.